United States Patent
Martinelli

(10) Patent No.: US 11,955,889 B2
(45) Date of Patent: Apr. 9, 2024

(54) MULTIPLE-OUTPUT BUCK VOLTAGE REGULATOR DEVICE

(71) Applicant: The Boeing Company, Chicago, IL (US)

(72) Inventor: Robert M. Martinelli, Temecula, CA (US)

(73) Assignee: The Boeing Company, Arlington, VA (US)

(*) Notice: Subject to any disclaimer, the term of this patent is extended or adjusted under 35 U.S.C. 154(b) by 217 days.

(21) Appl. No.: 17/449,232

(22) Filed: Sep. 28, 2021

(65) Prior Publication Data
US 2022/0231602 A1    Jul. 21, 2022

Related U.S. Application Data

(60) Provisional application No. 63/139,241, filed on Jan. 19, 2021.

(51) Int. Cl.
*H02M 3/158*    (2006.01)
*H02M 1/00*    (2006.01)
*H02M 1/088*    (2006.01)

(52) U.S. Cl.
CPC .......... *H02M 3/158* (2013.01); *H02M 1/088* (2013.01)

(58) Field of Classification Search
CPC ..... H02M 3/158; H02M 3/1584; H02M 1/088
See application file for complete search history.

(56) References Cited

U.S. PATENT DOCUMENTS

| | | | |
|---|---|---|---|
| 4,318,039 A * | 3/1982 | Abbott | H02M 3/33507 323/273 |
| 5,552,695 A | 9/1996 | Schwartz | |
| 5,977,753 A | 11/1999 | Edwards et al. | |
| 8,791,591 B1 * | 7/2014 | Vinciarelli | H02M 3/1582 323/267 |
| 10,468,980 B2 | 11/2019 | Abu Qahouq | |

(Continued)

FOREIGN PATENT DOCUMENTS

CN        103618460 A      3/2014

OTHER PUBLICATIONS

European Patent Office, Extended European Search Report Issued in Application No. 21208353.9, dated May 6, 2022, Germany, 10 pages.

*Primary Examiner* — Sisay G Tiku
(74) *Attorney, Agent, or Firm* — Alleman Hall & Tuttle LLP

(57) ABSTRACT

A buck voltage regulator device comprises a coupled inductor, a high-side switch electrically connected between an electrical energy source and a primary winding of the coupled inductor, a first low-side switch electrically connected between the primary winding and a ground node, a second low-side switch electrically connected between an auxiliary winding of the coupled inductor and the ground node, a first output node electrically connected to the primary winding, a second output node electrically connected to the auxiliary winding, a first output storage capacitor electrically connected to the primary winding between the first output node and the ground node, and a second output storage capacitor electrically connected to the auxiliary winding and between the second output node and the ground node.

20 Claims, 8 Drawing Sheets

(56) References Cited

U.S. PATENT DOCUMENTS

| | | | |
|---|---|---|---|
| 2007/0139020 A1* | 6/2007 | Johnson | H02M 3/158 323/207 |
| 2008/0123374 A1* | 5/2008 | Vinciarelli | H02M 7/10 363/65 |
| 2009/0001945 A1* | 1/2009 | Wickersham | H02M 3/1584 323/263 |
| 2014/0344600 A1* | 11/2014 | Breen | G06F 1/26 713/323 |
| 2016/0329815 A1* | 11/2016 | Massolini | H02M 3/33507 |
| 2018/0034374 A1 | 2/2018 | Breen et al. | |

* cited by examiner

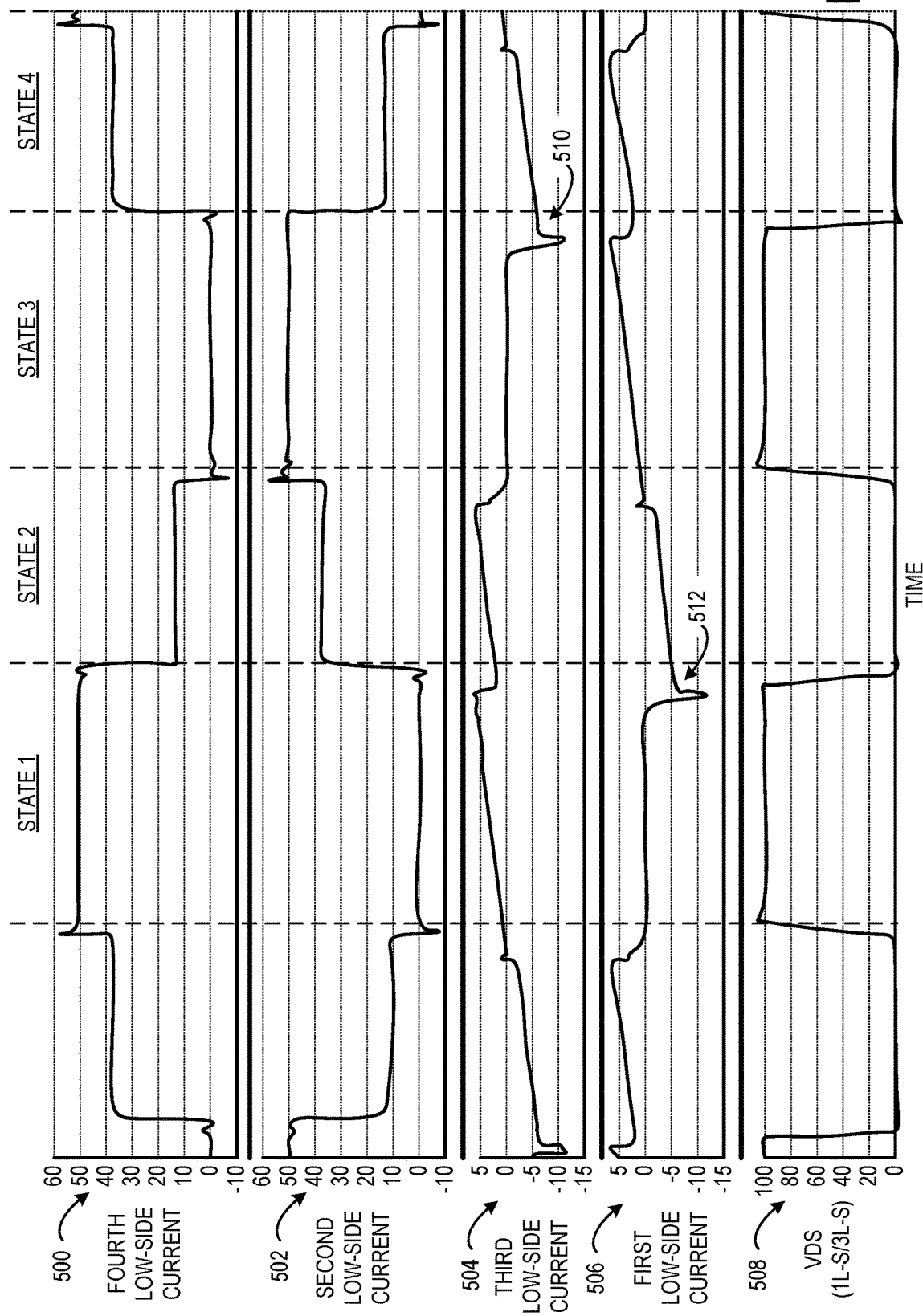

MULTIPLE-OUTPUT BUCK VOLTAGE REGULATOR DEVICE

CROSS REFERENCE TO RELATED APPLICATIONS

This application claims priority to U.S. Patent Application Ser. No. 63/139,241, filed Jan. 19, 2021, the entirety of which is hereby incorporated herein by reference for all purposes.

GOVERNMENT LICENSE RIGHTS

This invention was made with Government support under FA8808-10-C-0001 awarded by the Department of Defense. The government has certain rights in this invention.

FIELD

This invention relates generally to power supply devices, and more specifically, to a buck voltage regulator device.

BACKGROUND

A power supply device is configured to transfer electrical energy from an electrical energy source to an electrical load, while converting voltage and current characteristics of the electrical energy. As one example, a power supply device may comprise a buck voltage regulator device that is configured to step down voltage (while stepping up current) from an electrical energy source to an electrical load.

SUMMARY

According to one aspect of the present disclosure, a buck voltage regulator device is provided. The buck voltage regulator device comprises a coupled inductor including a primary winding and one or more auxiliary windings including a first auxiliary winding. A high-side switch is electrically connected between an electrical energy source and a starting end of the primary winding. A first low-side switch is electrically connected between the starting end of the primary winding and a ground node. A second low-side switch is electrically connected between a starting end of the first auxiliary winding and the ground node. A first output node is electrically connected to a terminal end of the primary winding. A second output node is electrically connected to a terminal end of the first auxiliary winding. A first output storage capacitor is electrically connected to the terminal end of the primary winding and electrically connected between the first output node and the ground node. A second output storage capacitor is electrically connected to the terminal end of the first auxiliary winding and electrically connected between the second output node and the ground node.

The features and functions that have been discussed can be achieved independently in various embodiments or may be combined in yet other embodiments, further details of which can be seen with reference to the following description and drawings.

BRIEF DESCRIPTION OF THE DRAWINGS

FIGS. 4-5 show graphs indicating example operation of the two-phase synchronous buck voltage regulator device of FIG. 2 throughout the different operating states shown in FIGS. 3A-3D.

DETAILED DESCRIPTION

Figure 1:
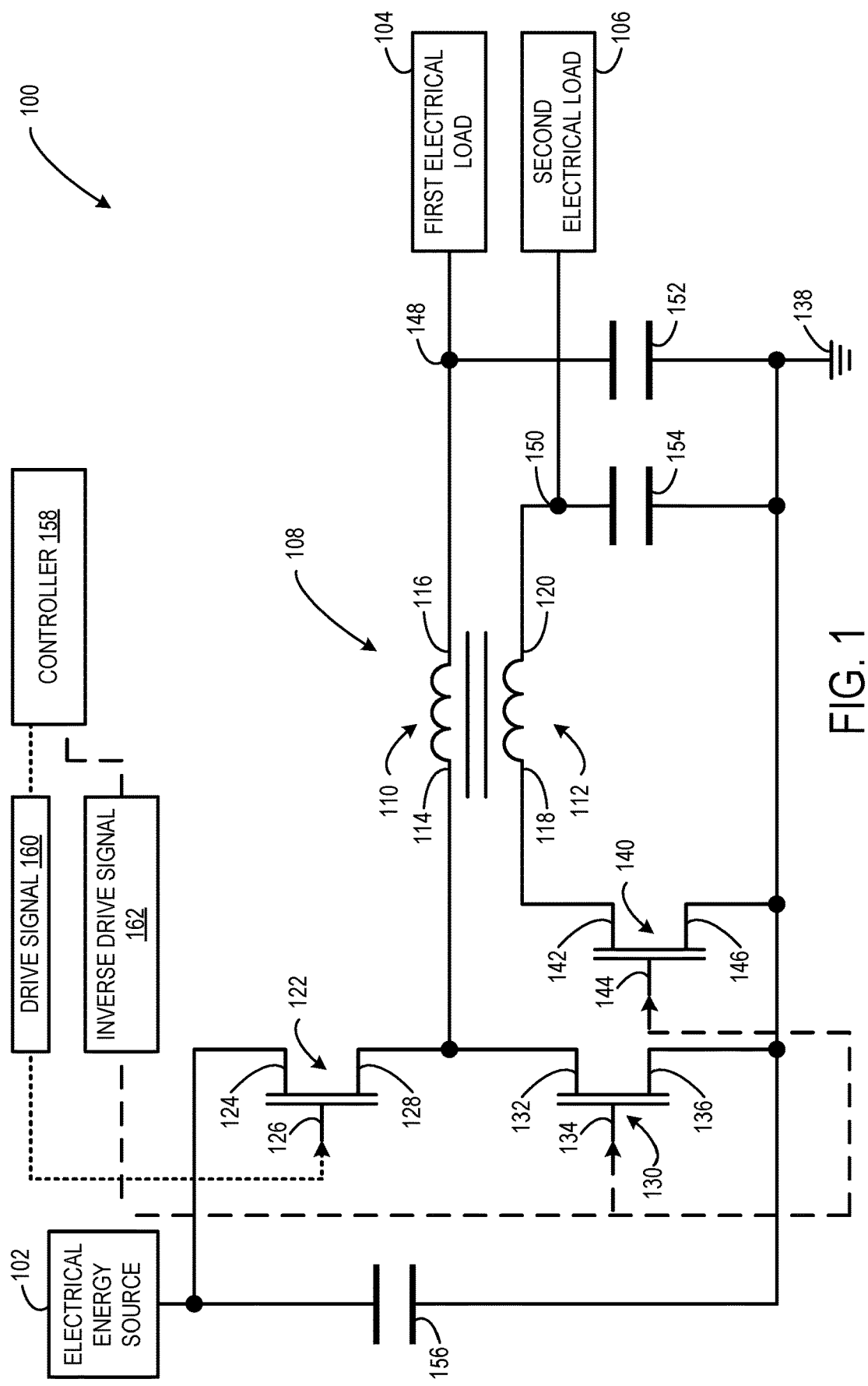
FIG. 1 shows an example embodiment of a synchronous buck voltage regulator device with synchronous rectified output.

A synchronous buck voltage regulator device typically comprises one or more energy storage elements, such as an inductor, a capacitor, or both that are controlled by two or more switches to step down voltage from an electrical energy source to an electrical load. A magnitude of a stepdown voltage of the synchronous buck voltage regulator device may be limited by an amount of current that flows across the switches.

In some examples, a synchronous buck voltage regulator may comprise a coupled inductor in place of a single inductor in order to provide different voltages at different outputs. The coupled inductor may comprise a primary winding and an auxiliary winding that is rectified by a diode. The addition of the auxiliary winding steps down a turn ratio of the coupled inductor relative to a single inductor, such that less current flows through the switches and more current flows through the windings of the coupled inductor when the switches are turned on. This allows for the synchronous buck voltage regulator device to handle a larger step down in voltage. Moreover, the auxiliary winding acts as a direct current (DC)-DC voltage regulator for an auxiliary output. In particular, the synchronous buck voltage regulator device outputs an intermediate voltage at a primary output electrically connected to the primary winding and outputs a lower voltage at the auxiliary output electrically connected to the auxiliary winding.

However, such a synchronous buck voltage regulator device lacks operational flexibility because the synchronous buck voltage regulator device is configured such that electrical energy has to be provided to both the primary and auxiliary outputs. In other words, more electrical energy cannot be provided to the auxiliary output than the primary output (i.e., the primary output cannot be zero volts).

To address the above and other issues, according to one aspect of the present disclosure, a buck voltage regulator device is provided. The buck voltage regulator device comprises a coupled inductor including a primary winding and an auxiliary winding. A high-side switch is electrically connected between an electrical energy source and a starting end of the primary winding. A first low-side switch is electrically connected between the starting end of the primary winding and a ground node. A second low-side switch is electrically connected between a starting end of the auxiliary winding and the ground node. A first output node is electrically connected to a terminal end of the primary winding. A second output node is electrically connected to a terminal end of the auxiliary winding. A first output storage capacitor is electrically connected to the terminal end of the primary winding and electrically connected between the first output node and the ground node. A second output storage capacitor is electrically connected to the terminal end of the auxiliary winding and electrically connected between the second output node and the ground node.

Such a circuit topology of the buck voltage regulator device allows for synchronous rectification of electrical energy to the second output node without necessarily having to provide electrical energy to the first output node. Instead, the first output storage capacitor can be used along with the primary winding to store electrical energy that can be subsequently supplied to the second output node. This allows the buck voltage regulator device to have a large step down in voltage between the electrical energy source and the second output node in a single stage. Moreover, such a circuit topology of the buck voltage regulator device has greater operational flexibility relative to a conventional buck voltage regulator device because either output can be designated to receive a greater amount of power as desired based on the particular implementation.

FIG. 1 shows an example embodiment of a synchronous buck voltage regulator device 100 with synchronous rectified output. The buck voltage regulator device 100 is configured to transfer electrical energy from an electrical energy source 102 to one or more electrical loads 104, 106, while converting voltage and current characteristics of the electrical energy. The buck voltage regulator device 100 may be employed in any suitable application. As one non-limiting example, the buck voltage regulator device 100 may be employed as an integrated power converter. As another non-limiting example, the buck voltage regulator device 100 may be employed as a point-of-load regulator.

The electrical energy source 102 may take any suitable form. In some examples, the electrical energy source 102 may comprise a rectified alternating current (AC) power source. In other examples, the electrical energy source 102 may comprise a DC power source. In some examples, the electrical energy source 102 may comprise an electrical bus. In some examples, the electrical energy source 102 may comprise an electrical energy storage device, such as a battery.

Additionally, a first electrical load 104 and a second electrical load 106 may take any suitable form of electrical component that consumes electrical energy. In some embodiments, a single electrical load may be electrically connected to the synchronous buck voltage regulator device 100 (e.g., either of the first electrical load 104 or the second electrical load 106 may be omitted).

The buck voltage regulator device 100 comprises a coupled inductor 108 including a primary winding 110 and an auxiliary winding 112. The primary winding 110 has a starting end 114 and a terminal end 116. The auxiliary winding 112 has a starting end 118 and a terminal end 120. In the illustrated embodiment, the coupled inductor 108 has a single auxiliary winding 112 to accommodate a second output node 150 electrically connected to the second electrical load 106. In some embodiments, the coupled inductor may include more than one auxiliary winding to accommodate additional auxiliary output nodes that are electrically connected to additional electrical loads. The coupled inductor may include any suitable number of windings to transfer electrical energy to any suitable number of electrical loads.

A high-side switch 122 is electrically connected between the electrical energy source 102 and the starting end 114 of the primary winding 110. The high-side switch 122 comprises a drain 124, a gate 126, and a source 128. The drain 124 is electrically connected to the electrical energy source 102. The source 128 is electrically connected to the starting end 114 of the primary winding 110.

A first low-side switch 130 is electrically connected between the starting end 114 of the primary winding 110 and a ground node 138. The first low-side switch 130 comprises a drain 132, a gate 134, and a source 136. The drain 132 is electrically connected to the starting end 114 of the primary winding 110. The source 136 is electrically connected to the ground node 138.

A second low-side switch 140 is electrically connected between the starting end 118 of the auxiliary winding 112 and the ground node 138. The second low-side switch 140 comprises a drain 142, a gate 144, and a source 146. The drain 142 is electrically connected to the starting end 118 of the auxiliary winding 112. The source 146 is electrically connected to the ground node 138.

In some embodiments, the primary winding 110 and the auxiliary winding 112 may be referenced to the same ground node. In other embodiments, the primary winding 110 and the auxiliary winding 112 may be referenced to different ground nodes (e.g., chassis ground, signal ground, or power ground).

The high-side switch 122, the first low-side switch 130, and the second low-side switch 140 may be any suitable type of switching device or combination of switching devices capable of conducting current in a manner that be controlled via synchronous rectification. In one example, the switches comprise Gallium Nitride Field Effect Transistors (GaN-FETs). GaNFETs may provide relatively low drain-source resistance that facilitates transfer of high circulating energy with high efficiency at a relatively high frequency (e.g., 500 kHz). In other non-limiting examples the switches may comprise Metal Oxide Silicon Field Effect Transistors (MOSFETs) and/or Schottky or silicon rectifiers.

A first output node 148 is electrically connected to the terminal end 116 of the primary winding 110. In some examples, the first output node 148 may be electrically connected to the first electrical load 104, such that electrical energy is transferred from the electrical energy source 102 to the first electrical load 104 and the second electrical load 106. In other examples, the first electrical load 104 may be omitted.

A second output node 150 is electrically connected to the terminal end 120 of the auxiliary winding 112. The second output node 150 may be electrically connected to the second electrical load 106. In one example, the second electrical load 106 may be used in a single-load application where electrical energy is transferred from the electrical energy source 102 to the second electrical load 106. In another example, electrical energy is transferred from the electrical energy source 102 to the first electrical load 104 and the second electrical load 106. Note that under conditions where the electrical load current at the second output node 150 is zero, the voltage would still be regulated by the buck voltage regulator device 100.

In the illustrated embodiment, the buck voltage regulator device 100 includes the first output node 148 and the second output node 150. In other embodiments, the buck voltage regulator device may include more than two output nodes. Further, in some embodiments, different output nodes may be referenced to different ground nodes (e.g., chassis ground, signal ground, or power ground).

A first output storage capacitor 152 is electrically connected to the terminal end 116 of the primary winding 110 and electrically connected between the first output node 148 and the ground node 138. A second output storage capacitor 154 is electrically connected to the terminal end 120 of the auxiliary winding 112 and electrically connected between the second output node 150 and the ground node 138. The first and second output storage capacitors 152, 154 are configured to store electrical energy that can be transferred to either of the first or second output nodes 148, 150 depending on the control scheme of the buck voltage regulator device 100.

In some embodiments, the buck voltage regulator device 100 optionally may comprise an input-side noise filter capacitor 156 that is electrically connected between the electrical energy source 102 and the ground node 138. The input-noise filter capacitor 156 is configured to filter electromagnetic interference at the electrical energy source 102.

The buck voltage regulator device 100 comprises a controller 158 that is configured to control the state of the first high-side switch 122, the first low-side switch 130, and the second low-side switch 140 according to a desired control scheme. The control scheme may vary depending on the load(s) on the first and second output nodes 148, 150 and the voltage desired at the first and second output nodes 148, 150.

In one example, the controller 158 is configured to operate the high-side switch 122 with a drive signal 160 and operate the first low-side switch 130 and the second low-side switch 140 with an inverse drive signal 162 to adjust an output voltage at the second output node 150 relative to an input voltage at the electrical energy source 102. The inverse drive signal 162 may be the same waveform as the drive signal 160 but inverted. In other words, the high-side switch 122 may be turned on when the first low-side switch 130 and the second low-side switch 140 are turned off and vice versa. When the high-side switch 122 is turned on and the first and second low-side switches 130, 140 are turned off, current flows from the electrical energy source 102 through the primary winding 110 of the coupled inductor 108 and electrical energy is stored in the primary winding 110 and the first output storage capacitor 152. When the high-side switch 122 is turned off and the first and second low-side switches 130, 140 are turned on, electrical energy stored in the primary winding 110 and in the first output storage capacitor 152 is transferred through the auxiliary winding 112 to the second output node 150. Such synchronous rectification of the switches according to the control scheme allows for bidirectional transfer of electrical energy across the buck voltage regulator device 100. In particular, electrical energy is stored in the first output storage capacitor 152 when the high-side switch 122 is turned on and current flows through the primary winding 110. Subsequently, when the high-side switch 122 is turned off and the first and second low-side switches 130, 140 are turned on, the electrical energy that is stored in the first output storage capacitor 152 changes direction and flows back to the coupled inductor 108 where the electrical energy is transferred through the auxiliary winding 112 to the second output node 150. In this way, the coupled inductor 108 acts as a transformer. Moreover, such synchronous rectification of the switches according to the control scheme allows for the first output node 148 to be unloaded while still being able to transfer electrical energy to the second output node 150.

The controller 158 may operate the switches according to a control scheme that is based on a duty cycle of the drive signal and a turns ratio of the coupled inductor 108. In one example, the control scheme may conform to the DC transfer function:

$$V_o = D \times V_{in}\left(\frac{N_a}{N_p}\right)$$

where $V_o$ is the output voltage, D is the duty cycle, $V_{in}$ is the input voltage, $N_a$ is a number of turns of the auxiliary winding 112, $N_p$ is a number of turns of the primary winding 110, and $$\left(\frac{N_a}{N_p}\right)$$

is the turns ratio of the coupled inductor 108.

In some examples, the duty cycle of the drive signal is less than 50% and the number of turns of the primary winding is greater than a number of turns of the auxiliary winding such that the output voltage at the second output node 150 is stepped down relative to the input voltage at the electrical energy source. In one example, the duty cycle is set to ~27% on high side and ~73% on the low side. By setting the duty cycle to less than 50%, efficiency of the buck voltage regulator device 100 may be increased relative to a buck voltage regulator device that relies on diodes for rectification.

The buck voltage regulator device 100 may be configured to transfer electrical energy to either or both of the first and second output node at desired voltage levels by changing the turns ratio of the coupled inductor 108 and the duty cycle. Such a circuit topology of the buck voltage regulator device has greater operational flexibility relative to a conventional buck voltage regulator device because either output can be designated to receive a greater amount of power as desired based on the particular implementation.

The above-described buck voltage regulator device is configured to transfer electrical energy to the output(s) that is pulsed in accordance with the duty cycle. Such pulsating output may cause output current ripple where the output current rises during the on-state and falls during the off-state. Such output current ripple may be affected by switching frequency, output capacitance, inductor, load, and/or any other current limiting features of the buck voltage regulator device. Such output current ripple may be filtered via one or more noise-filtering components, such as a noise filtering capacitor.

Figure 2:
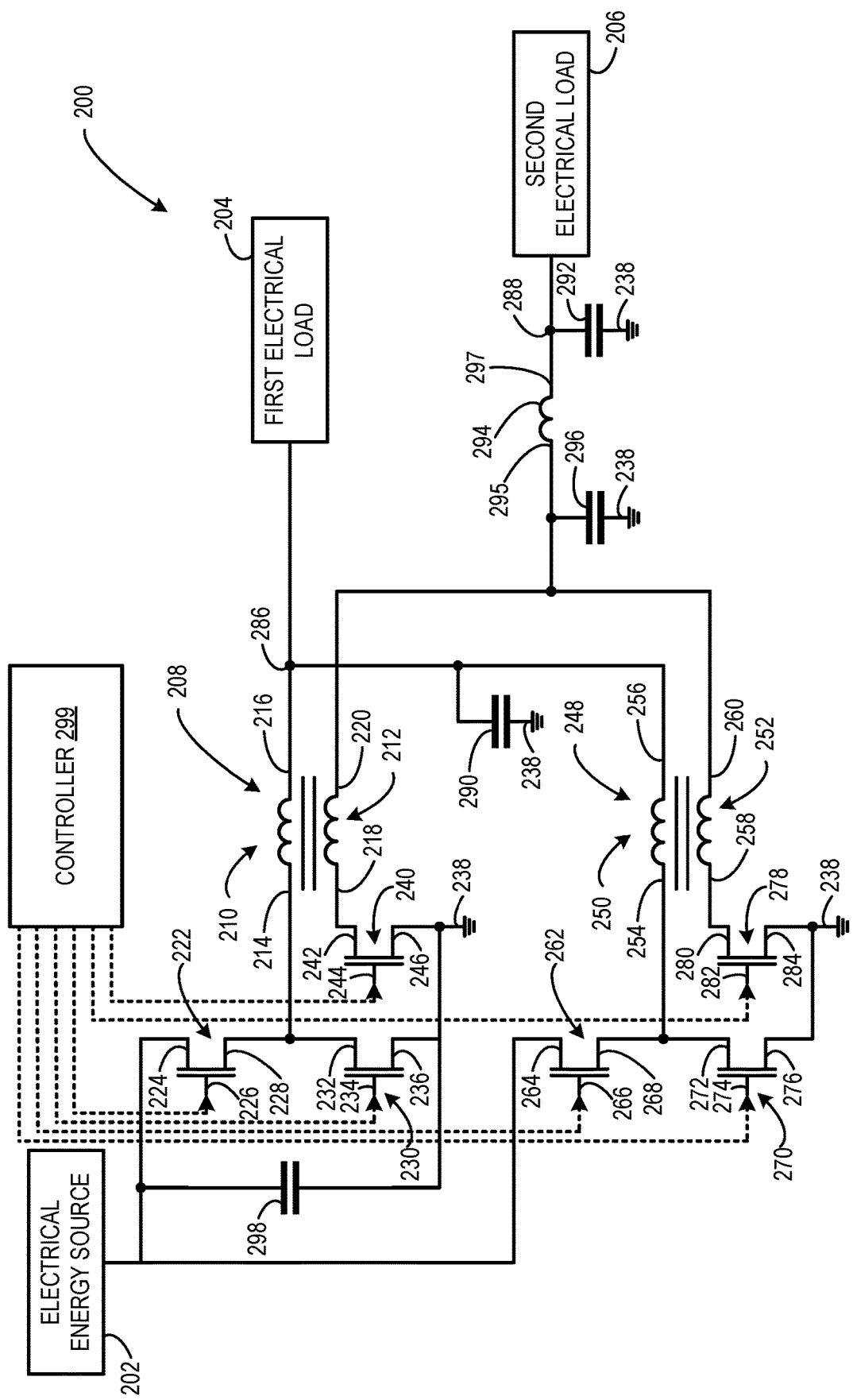
FIG. 2 shows an example embodiment of a two-phase synchronous buck voltage regulator device with synchronous rectified output.

FIG. 2 shows an example embodiment of a two-phase synchronous buck voltage regulator device 200 with synchronous rectified output. The two-phase synchronous buck voltage regulator device 200 may have reduced output current ripple relative to the buck voltage regulator device 100 shown in FIG. 1. The two-phase synchronous buck voltage regulator device 200 is configured to transfer electrical energy from an electrical energy source 202 to one or more electrical loads 204, 206, while converting voltage and current characteristics of the electrical energy. The buck voltage regulator device 200 may be employed in any suitable application. As one non-limiting example, the buck voltage regulator device 200 may be employed as an integrated power converter. As another non-limiting example, the buck voltage regulator device 200 may be employed as a point-of-load regulator. As used herein, the term "two-phase" refers to the configuration and control of two coupled inductors and two sets of associated high-side and low-side switches of the two-phase synchronous buck voltage regulator device 200. In this context, the buck voltage regulator device 100 of FIG. 1 may be considered a "single-phase" buck voltage regulator device.

The electrical energy source 202 may take any suitable form. In some examples, the electrical energy source 202 may comprise a rectified AC power source. In other examples, the electrical energy source 202 may comprise a DC power source. In some examples, the electrical energy source 202 may comprise an electrical bus. In some examples, the electrical energy source 202 may comprise an electrical energy storage device, such as a battery.

A first electrical load 204 and a second electrical load 206 may take any suitable form of electrical component that consumes electrical energy. In some embodiments, a single electrical load may be electrically connected to the two-phase synchronous buck voltage regulator device 200 (e.g., either of the first electrical load 204 or the second electrical load 206 may be omitted).

The two-phase synchronous buck voltage regulator device 200 comprises a first coupled inductor 208 including a first primary winding 210 and a first auxiliary winding 212. The first primary winding 210 has a starting end 214 and a terminal end 216. The first auxiliary winding 212 has a starting end 218 and a terminal end 220.

A first high-side switch 222 is electrically connected between the electrical energy source 202 and the starting end 214 of the first primary winding 210. The first high-side switch 222 comprises a drain 224, a gate 226, and a source 228. The drain 224 is electrically connected to the electrical energy source 202. The source 228 is electrically connected to the starting end 214 of the first primary winding 210.

A first low-side switch 230 is electrically connected between the starting end 214 of the first primary winding 210 and a ground node 238. The first low-side switch 230 comprises a drain 232, a gate 234, and a source 236. The drain 232 is electrically connected to the starting end 214 of the primary winding 210. The source 236 is electrically connected to the ground node 238.

A second low-side switch 240 is electrically connected between the starting end 218 of the first auxiliary winding 212 and the ground node 238. The second low-side switch 240 comprises a drain 242, a gate 244, and a source 246. The drain 242 is electrically connected to the starting end 218 of the first auxiliary winding 212. The source 246 is electrically connected to the ground node 238.

The two-phase synchronous buck voltage regulator device 200 comprises a second coupled inductor 248 including a second primary winding 250 and a second auxiliary winding 252. The second primary winding 250 has a starting end 254 and a terminal end 256. The second auxiliary winding 252 has a starting end 258 and a terminal end 260.

A second high-side switch 262 is electrically connected between the electrical energy source 202 and the starting end 254 of the second primary winding 250 of the second coupled inductor 248. The second high-side switch 262 comprises a drain 264, a gate 266, and a source 268. The drain 264 is electrically connected to the electrical energy source 202. The source 268 is electrically connected to the starting end 254 of the second primary winding 250.

A third low-side switch 270 is electrically connected between the starting end 254 of the second primary winding 250 of the second coupled inductor 248 and the ground node 238. The third low-side switch 270 comprises a drain 272, a gate 274, and a source 276. The drain 272 is electrically connected to the starting end 254 of the second primary winding 250. The source 276 is electrically connected to the ground node 238.

A fourth low-side switch 278 is electrically connected between the starting end 258 of the second auxiliary winding 252 of the second coupled inductor 248 and the ground node 238. The fourth low-side switch 278 comprises a drain 280, a gate 282, and a source 284. The drain 280 is electrically connected to the starting end 258 of the second auxiliary winding 252 of the second coupled inductor 248. The source 284 is electrically connected to the ground node 238.

The first high-side switch 222, the second high-side switch 262, the first low-side switch 230, the second low-side switch 240, the third low-side switch 270, and the fourth low-side switch 278 may be any suitable type of switching device or combination of switching devices capable of conducting current in a manner that be controlled via synchronous rectification. Non-limiting examples of such switches comprise MOSFETs, GaNFETs, and Schottky or silicon rectifiers.

A first output node 286 is electrically connected to the terminal end 216 of the first primary winding 210 of the first coupled inductor 208 and the terminal end 256 of the second primary winding 250 of the second coupled inductor 248. A second output node 288 is electrically connected to the terminal end 220 of the first auxiliary winding 212 of the first coupled inductor 208 and the terminal end 260 of the second auxiliary winding 252 of the second coupled inductor 248. In some examples, electrical loads may be electrically connected to both the first and second output nodes 286, 288. In other examples, a single electrical load may be electrically connected to either of the first output node 286 or the second output node 288.

In the illustrated embodiment, the two-phase synchronous buck voltage regulator device 200 includes two coupled inductors and two sets of associated high-side and low-side switches. In other embodiments, a synchronous buck voltage regulator device may include more than two phases of inductors and associates sets of switches to accommodate more than two output nodes. A synchronous buck voltage regulator device may include any suitable number of phases of coupled inductors and associated sets of switches.

A first output storage capacitor 290 is electrically connected to the terminal end 216 of the first primary winding 210 of the first coupled inductor 208 and the terminal end 256 of the second primary winding 250 of the second coupled inductor 248. Further, the first output storage capacitor 290 is electrically connected between the first output node 286 and the ground node 238.

A second output storage capacitor 292 is electrically connected to the terminal end 220 of the first auxiliary winding 212 of the first coupled inductor 208 and the terminal end 260 of the second auxiliary winding 252 of the second coupled inductor 248. Further, the second output storage capacitor 292 is electrically connected between the second output node 288 and the ground node 238.

In some embodiments, the two-phase synchronous buck voltage regulator device 200 optionally may comprise an output ripple-reducing inductor 294 including a starting end 295 and a terminal end 297. The starting end 295 of the output ripple-reducing inductor 294 is electrically connected to the terminal end 220 of the first auxiliary winding 212 of the first coupled inductor 208 and the terminal end 260 of the second auxiliary winding 252 of the second coupled inductor 248. The terminal end 297 of the output ripple-reducing inductor 294 is electrically connected to the second output storage capacitor 292 and the second output node 288. Further, in some embodiments, the two-phase synchronous buck voltage regulator device 200 optionally may comprise an output-side noise filter capacitor 296 that is electrically connected between the first auxiliary winding 212 of the first coupled inductor 208, the terminal end 260 of the second auxiliary winding 252 of the second coupled inductor 248, the starting end 295 of the output ripple-reducing inductor 294 and the ground node 238. The output ripple-reducing inductor 294 and the output-side noise filter capacitor 296 may collectively act as a filter to reduce ripple current at the second output node 288.

In some embodiments, the two-phase synchronous buck voltage regulator device 200 optionally may comprise an input-side noise filter capacitor 298 that is electrically connected between the electrical energy source 202 and the ground node 238. The input-side noise filter capacitor 298 is configured to filter electromagnetic interference at the electrical energy source 202.

The two-phase synchronous buck voltage regulator device 200 comprises a controller 299 configured to control the state of the first high-side switch 222, the second high-side switch 262, the first low-side switch 230, the second low-side switch 240, the third low-side switch 270, and the fourth low-side switch 278 according to a desired control scheme. The control scheme may vary depending on the load(s) on the first and second output nodes 286, 288 and the voltage desired at the first and second output nodes 286, 288.

In one example, the controller 299 is configured to operate the two-phase synchronous voltage regulator device 200 in four states to adjust an output voltage at the second output node 288 relative to an input voltage at the electrical energy source 202 based, at least in part, on a first turns ratio of the first coupled inductor and a second turns ratio of the second coupled inductor. For example, the control scheme may conform to the DC transfer function described above.

Figure 3A:
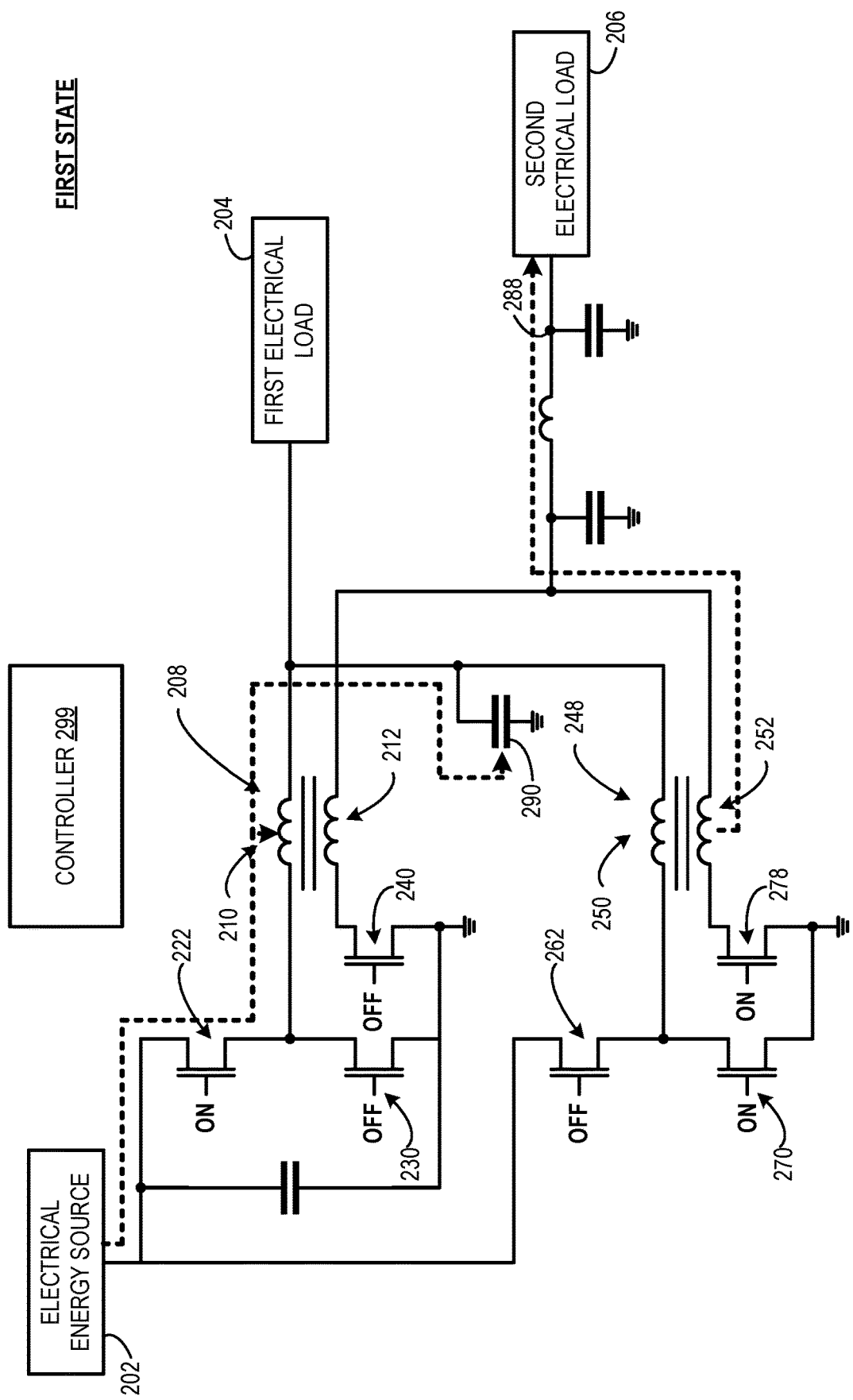
FIGS. 3A-3D show four operating states of the two-phase synchronous buck voltage regulator device of FIG. 2.

FIGS. 3A-3D show four example operating states of the two-phase synchronous buck voltage regulator device 200 of FIG. 2 during an operating cycle. In FIG. 3A, during a first state of the four states, the controller 299 is configured to turn on the first high-side switch 222, turn on the third low-side switch 270, and turn on the fourth low-side switch 278. Further, the controller 299 is configured to turn off the second high-side switch 262, turn off the first low-side switch 230, and turn off the second low-side switch 240. In this first operating state, electrical energy is transferred from the electrical energy source 202 and stored in the first primary winding 210 of the first coupled inductor 208 and the first output storage capacitor 290 and electrical energy stored in the second primary winding 250 of the second coupled inductor 248 is transferred through the second auxiliary winding 252 of second coupled inductor 248 to the second output node 288.

Figure 3B:
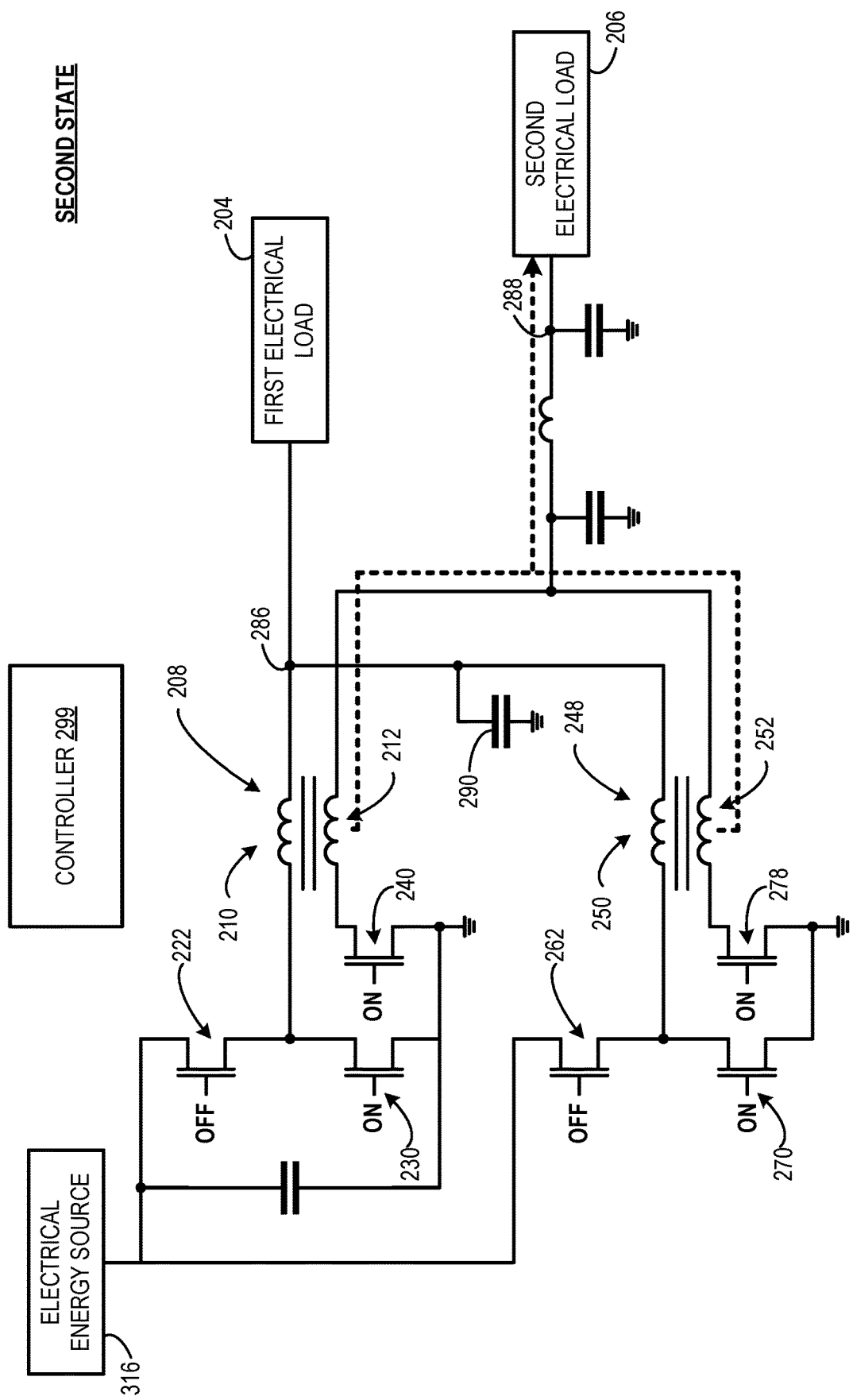

In FIG. 3B, during a second state of the four states, the controller 299 is configured to turn on the first low-side switch 230, turn on the second low-side switch 240, turn on the third low-side switch 270, and turn on the fourth low-side switch 278. Further, the controller 299 is configured to turn off the first high-side switch 222 and turn off the second high-side switch 262. In this second operating state, electrical energy is transferred from the first primary winding 210 of the first coupled inductor 208 through the first auxiliary winding 212 of the first coupled inductor 208 to the second output node 288 and electrical energy stored in the second primary winding 250 of the second coupled inductor 248 is transferred through the second auxiliary winding 252 of second coupled inductor 248 to the second output node 288.

Figure 3C:
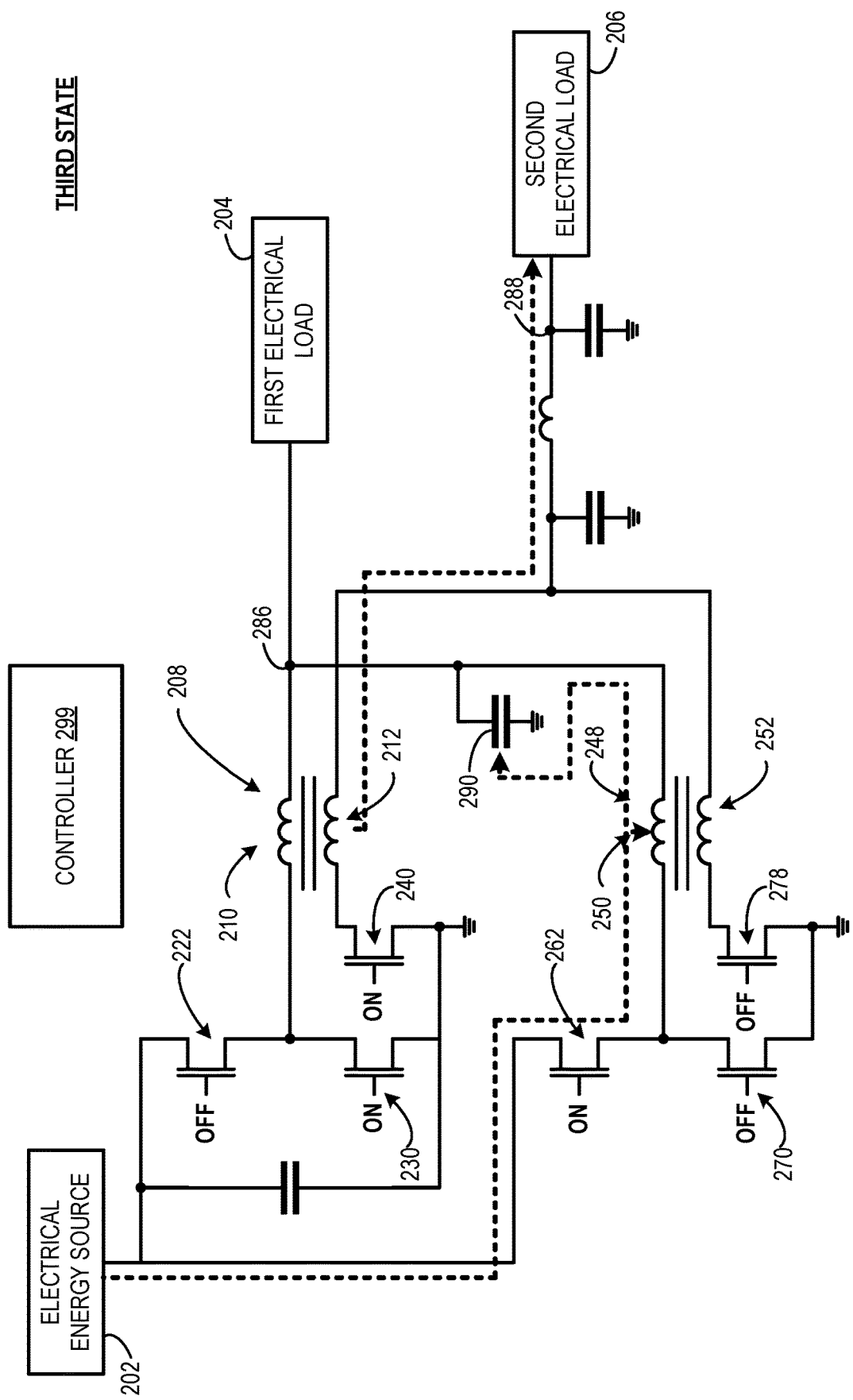

In FIG. 3C, during a third state of the four states, the controller 299 is configured to turn on the second high-side switch 262, turn on the first low-side switch 230, and turn on the second low-side switch 240. Further, the controller 299 is configured to turn off the first high-side switch 222, turn off the third low-side switch 270, and turn off the fourth low-side switch 278. In this third operating state, electrical energy stored in the first primary winding 210 of the first coupled inductor 208 is transferred through the first auxiliary winding 212 of the first coupled inductor 208 to the second output node 288 and electrical energy is transferred from the electrical energy source 202 and stored in the second primary winding 250 of the second coupled inductor 248 and the first output storage capacitor 290.

Figure 3D:
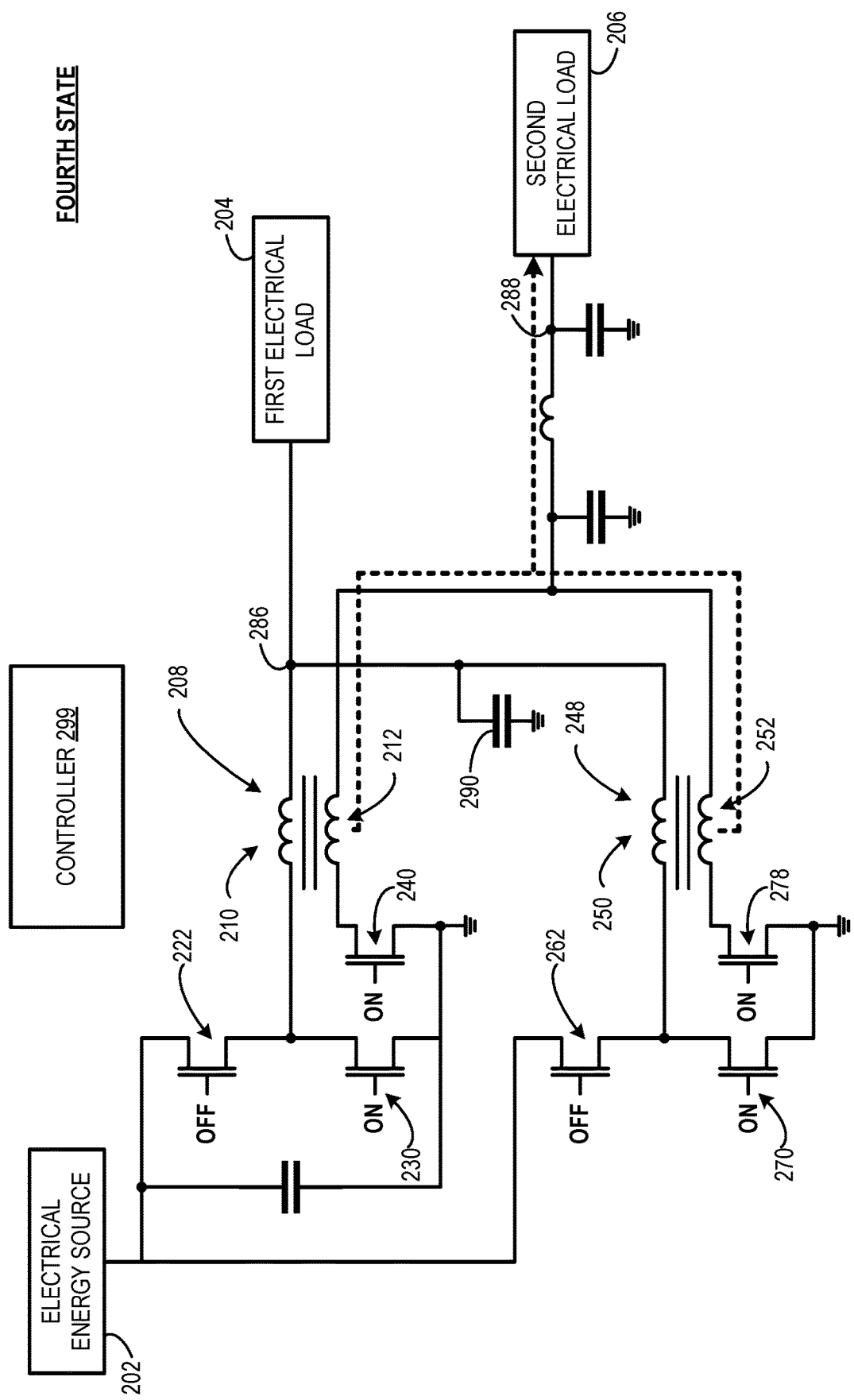

In FIG. 3D, during a fourth state of the four states, the controller 299 is configured to turn on the first low-side switch 230, turn on the second low-side switch 240, turn on the third low-side switch 270, and turn on the fourth low-side switch 278. Further, the controller 299 is configured to turn off the first high-side switch 222 and turn off the second high-side switch 262. In this fourth operating state, electrical energy stored in the first primary winding 210 of the first coupled inductor 208 is transferred through the first auxiliary winding 212 of the first coupled inductor 208 to the second output node 288 and electrical energy stored in the second primary winding 250 of the second coupled inductor 248 is transferred through the second auxiliary winding 252 of the second coupled inductor 248 to the second output node 288.

The above-described control scheme may be repeated each operating cycle to adjust an output voltage at the second output node relative to an input voltage at the electrical energy source. The control scheme is provided as a non-limiting example, and the controller may be configured to employ other controls schemes without departing from the scope of the present disclosure. In general, the duty cycle and the turns ratios of the coupled inductors may be modified depending on the application to provide any suitable output voltage(s) to either of the first or second output nodes.

In one example, the control scheme may dictate that the high-side switches are switched 180 degrees out of phase. Further, each high-side switch may have ~27% duty cycle. Correspondingly, the low-side switches may have a ~73% duty cycle. The switches may be switched at a switching frequency of 500 KHz. This complimentary timing of the high-side and low-side switches results in no phase shift between charging/discharging of the first and second coupled inductors. Moreover, since the second and fourth operating states are the same, both phases of the device deliver electrical energy to the output 50% of the operating cycle. Additionally, each single phase of the device delivers electrical energy to the output 25% of the operating cycle. In other examples, the two-phase synchronous buck voltage regulator device may operate using different duty cycles and different switching frequencies without departing from the scope of the present disclosure.

Furthermore, in some embodiments, the order of the operating states may be switched within an operating cycle. For example, an alternate order may include the third state (e.g. shown in FIG. 3C), the fourth state (shown in FIG. 3D), the first state (e.g., shown in FIG. 3A), and the second state (e.g., shown in FIG. 3B).

According to the topology of the two-phase synchronous buck voltage regulator device 200 and the corresponding control scheme, the coupled inductors not only function as inductors but also provide transformer action that allows for electrical energy to be transferred to the output node(s) during both on and off phases of the duty cycles of the switches. Moreover, the topology of the two-phase synchronous buck voltage regulator device 200 allows for relatively high ripple current on the primary side of the coupled inductors without introducing a correspondingly high ripple current on the output side of the coupled inductors. In other words, electrical energy transferred through the auxiliary side of the coupled inductors to the output node(s) may have reduced ripple current relative to the ripple current on the primary side of the coupled inductors.

In some embodiments, the two-phase synchronous buck voltage regulator device 200 optionally may be configured to perform zero-voltage switching of the switches using such high ripple current on the primary side of the coupled inductors. Zero-voltage switching may be performed when ripple current flows backwards into the low-side switch and applies a voltage on the gate that pulls the current low to change the state of the switch. Such zero-voltage switching using inductive energy may reduce energy losses of the switch and thus may increase efficiency of the two-phase synchronous buck voltage regulator device 200. In other embodiments, the two-phase synchronous buck voltage regulator device 200 may operate without performing zero-voltage switching.

Figure 4:
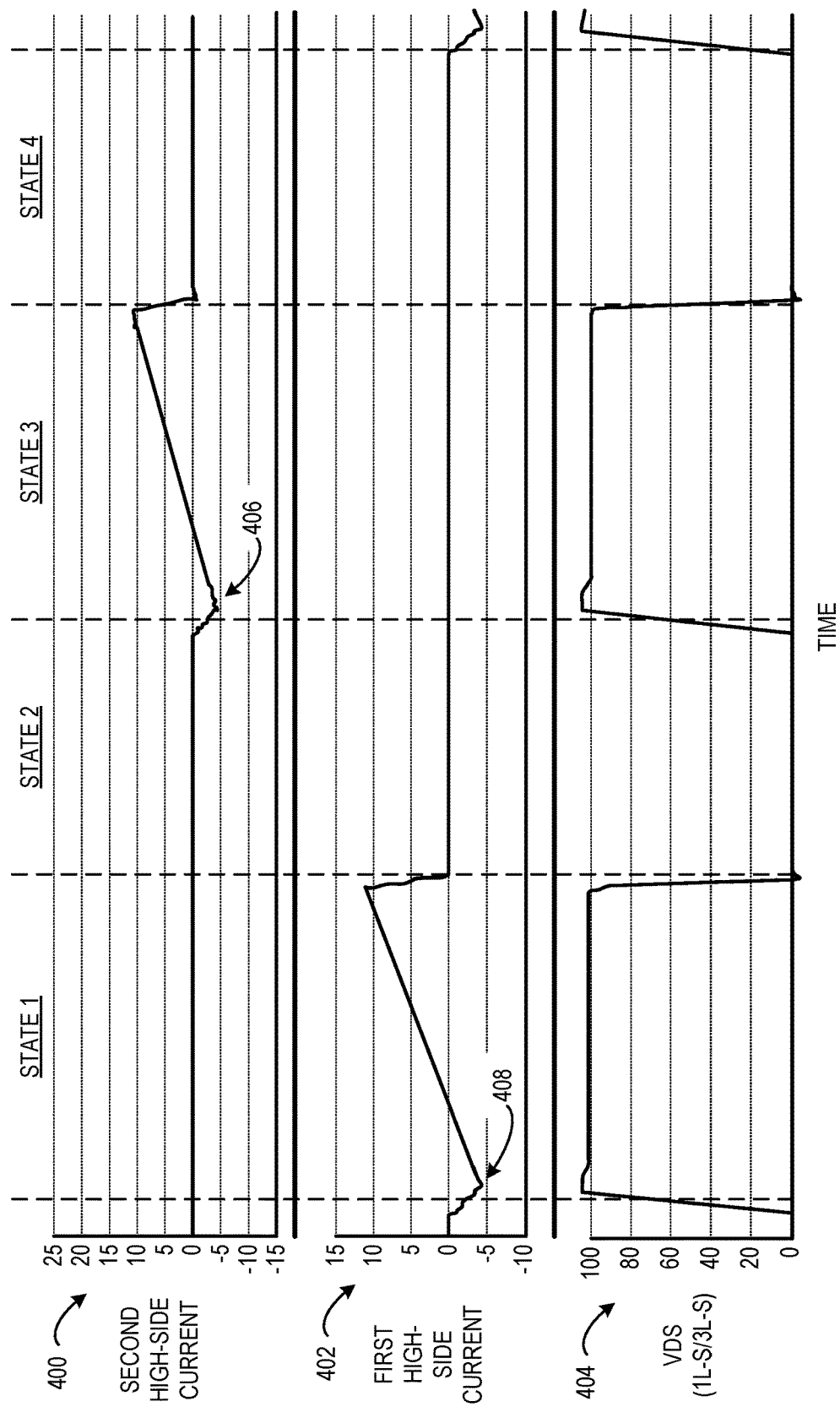

FIGS. 4-5 show graphs indicating example operation of the two-phase synchronous buck voltage regulator device 200 of FIG. 2 throughout the different operating states shown in FIGS. 3A-3D. FIG. 4 shows operation of the first and second high-side switches and the drain-to-source voltage across the first and third low-side switches throughout the four operating states. The current and voltage levels of the illustrated graphs are provided as non-limiting examples. The buck voltage regulator device may be configured to operate within any suitable range of current/voltage levels depending on the implementation. The graph 400 shows the second high-side switch current over time. The current remains at zero in the first and second states of the operating cycle since the second high-side switch is turned off. In the third state, the second high-side switch is turned on and the current ramps up. Note at 406, current ripple occurs when the second high-side switch is initially turned on. In the fourth state, the second high-side switch is turned off and the current returns to zero.

The graph 402 shows the current across the first high-side switch over time. In the first state, the first high-side switch is turned on and the current ramps up. Note at 408, current ripple occurs when the first high-side switch is initially turned on. In the second state, the first high-side switch is turned off and the current returns to zero. The current remains at zero in the third and fourth states since the first high-side switch is turned off.

The graph 404 shows the drain-to-source voltage across the first and third low-side switches. The voltage waveform is a square wave that alternates between high and low voltages with the voltage going high in the first and third states and low in the second and fourth states. Note that the current ripple at 406 and 408 minimally impacts the voltage waveform.

FIG. 5 shows operation of the first, second, third, and fourth low-side switches and the drain-to-source voltage across the first and third low-side switches throughout the four operating states. The graph 500 shows the fourth low-side switch current over time. In the first state, the fourth low-side switch is turned on and the current steps up to a peak level. In the second state, the fourth low-side switch remains turned on and the current level steps down because current flows through the auxiliary winding to the second output node. In the third state, the fourth low-side switch is turned off and the current steps down to zero. In the fourth state, the fourth low-side switch is turned on and the current steps up again.

The graph 502 shows the second low-side switch current over time. The second low-side switch current mirrors the behavior of the fourth low-side switch current throughout the four operating states.

The graph 504 shows the third low-side switch current over time. In the first state, the third low-side switch is turned on and the current ramps up. In the second state, the third low-side switch remains turned on and the current again ramps up. In the third state, the third low-side switch is turned off and the current steps down to zero. Note at 510, current ripple occurs when the third low-side switch transitions from the off state to the on state.

The graph 506 shows the first low-side switch current over time. In the first state, the first low-side switch is turned off and the current is zero. In the second state, the first low-side switch is turned on and the current ramps up. Note at 512, current ripple occurs when the first low-side switch transitions from the off state to the one state. In the second state, the first low-side switch is turned on and the current again ramps. In the third state and the fourth state, the first low-side switch remains turned on and the current ramps up.

The graph 508 shows the drain-to-source voltage across the first and third low-side switches. The voltage waveform is a square wave that alternates between high and low voltages with the voltage going high in the first and third states and low in the second and fourth states. Note that the current ripple at 510 and 512 minimally impacts the voltage waveform.

The sum of the fourth low-side switch current and the second low-side switch current remains the same across all four states of the operating cycle. Such behavior indicates that the current ripple on the primary side of the coupled inductors at 406, 408, 510, and 512 minimally affects or is not introduced to the output side of the coupled inductors. Accordingly, the two-phase synchronous buck voltage regulator device 200 may have minimal ripple at the output node(s).

The control scheme described above with reference to FIGS. 3A-3D, 4, and 5 is provided as an exemplary control scheme. Parameters of the control scheme (e.g., duty cycle, input voltage, output voltage, input current, output current, turns ratio, switching frequency) may vary without departing from the scope of this disclosure. Further, in other embodiments, the buck voltage regulator device 200 of FIG. 2 may be controlled using a different control scheme. For example, another control scheme may employ a different number of operating states per operating cycle.

The topology of the synchronous buck voltage regulator device is not restricted to one or two phases. A synchronous buck voltage regulator device may include any suitable number of phases including one, two, three, or more coupled inductors and associated sets of switches based on the capabilities of the controller that operates the synchronous buck voltage regulator device.

The topology of the synchronous buck voltage regulator device and corresponding control scheme described herein may allow for a significant step up or down in voltage in a single stage with high efficiency. Such a buck voltage regulator device may be used in place of a multi-stage, step-down converter. Since the buck voltage regulator device has a single stage, the buck voltage regulator device may have a smaller device footprint and reduced weight relative to other multi-stage converter implementations. Moreover, such a single-stage buck voltage regulator device may have reduced heat generation relative to other multi-stage converter implementations. The synchronous buck voltage regulator concepts described herein may be broadly applicable to any suitable power supply device that is configured to transfer electrical energy from an electrical energy source to an electrical load, while converting voltage and current characteristics of the electrical energy.

In an example, a buck voltage regulator device comprises a coupled inductor including a primary winding and one or more auxiliary windings including a first auxiliary winding, a high-side switch electrically connected between an electrical energy source and a starting end of the primary winding, a first low-side switch electrically connected between the starting end of the primary winding and a ground node, a second low-side switch electrically connected between a starting end of the first auxiliary winding and the ground node, a first output node electrically connected to a terminal end of the primary winding, a second output node electrically connected to a terminal end of the first auxiliary winding, a first output storage capacitor electrically connected to the terminal end of the primary winding and electrically connected between the first output node and the ground node, and a second output storage capacitor electrically connected to the terminal end of the first auxiliary winding and electrically connected between the second output node and the ground node. In this example and/or other examples, the buck voltage regulator device may further comprise a controller configured to operate the high-side switch with a drive signal and operate the first low-side switch and the second low-side switch with an inverse of the drive signal to adjust an output voltage at the second output node relative to an input voltage at the electrical energy source based on a duty cycle of the drive signal and a turns ratio of the coupled inductor. In this example and/or other examples, the duty cycle of the drive signal may be less than 50% and a number of turns of the primary winding may be greater than a number of turns of the first auxiliary winding such that the output voltage at the second output node is stepped down relative to the input voltage. In this example and/or other examples, the coupled inductor may be a first coupled inductor, the primary winding may be a first primary winding, the high-side switch may be a first high-side switch, and the buck voltage regulator device may further comprise a second coupled inductor including a second primary winding and one or more auxiliary windings including a second auxiliary winding, a second high-side switch electrically connected between the electrical energy source and a starting end of the second primary winding of the second coupled inductor, a third low-side switch electrically connected between the starting end of the second primary winding of the second coupled inductor and the ground node, and a fourth low-side switch electrically connected between a starting end of the second auxiliary winding of the second coupled inductor and the ground node. In this example and/or other examples, the buck voltage regulator device may further comprise an output ripple-reducing inductor electrically connected between the terminal end of the first auxiliary winding of the first coupled inductor, the terminal end of the second auxiliary winding of the second coupled inductor, and the second output node, an input-side noise filter capacitor electrically connected between the electrical energy source and the ground node, and an output-side noise filter capacitor electrically connected between the output ripple-reducing inductor and the ground node. In this example and/or other examples, the first high-side switch, the second high-side switch, the first low-side switch, the second low-side switch, the third low-side switch, and the fourth low-side switch may comprise Gallium Nitride Field Effect Transistors (GaNFETS). In this example and/or other examples, the buck voltage regulator device may further comprise a controller configured to operate the buck voltage regulator device in four states to adjust an output voltage at the second output node relative to an input voltage at the electrical energy source based on a first turns ratio of the first coupled inductor and a second turns ratio of the second coupled inductor. In this example and/or other examples, during a first state of the four states, the controller may be configured to turn on the first high-side switch, turn on the third low-side switch, and turn on the fourth low-side switch, such that electrical energy is transferred from the electrical energy source and stored in the first primary winding of the first coupled inductor and the first output storage capacitor and electrical energy stored in the second primary winding of the second coupled inductor is transferred through the second auxiliary winding of second coupled inductor to the second output node. In this example and/or other examples, during a second state of the four states, the controller may be configured to turn on the first low-side switch, turn on the second low-side switch, turn on the third low-side switch, and turn on the fourth low-side switch, such that electrical energy is transferred from the first primary winding of the first coupled inductor through the first auxiliary winding of the first coupled inductor to the second output node and electrical energy stored in the second primary winding of the second coupled inductor is transferred through the second auxiliary winding of second coupled inductor to the second output node. In this example and/or other examples, during a third state of the four states, the controller may be configured to turn on the second high-side switch, turn on the first low-side switch, and turn on the second low-side switch, such that electrical energy stored in the first primary winding of the first coupled inductor is transferred through the first auxiliary winding of the first coupled inductor to the second output node and electrical energy is transferred from the electrical energy source and stored in the second primary winding of the second coupled inductor and the first output storage capacitor. In this example and/or other examples, during a fourth state of the four states, the controller may be configured to turn on the first low-side switch, turn on the second low-side switch, turn on the third low-side switch, and turn on the fourth low-side switch, such that electrical energy stored in the first primary winding of the first coupled inductor is transferred through the first auxiliary winding of the first coupled inductor to the second output node and electrical energy stored in the second primary winding of the second coupled inductor is transferred through the second auxiliary winding of the second coupled inductor to the second output node.

In another example, a buck voltage regulator device, comprises a first coupled inductor including a first primary winding and one or more auxiliary windings including a first auxiliary winding, a first high-side switch electrically connected between an electrical energy source and a starting end of the first primary winding of the first coupled inductor, a first low-side switch electrically connected between the starting end of the first primary winding of the first coupled inductor and a ground node, a second low-side switch electrically connected between a starting end of the first auxiliary winding of the first coupled inductor and the ground node, a second coupled inductor including a second primary winding and one or more auxiliary windings including a second auxiliary winding, a second high-side switch electrically connected between the electrical energy source and a starting end of the second primary winding of the second coupled inductor, a third low-side switch electrically connected between the starting end of the second primary winding of the second coupled inductor and the ground node, a fourth low-side switch electrically connected between a starting end of the second auxiliary winding of the second coupled inductor and the ground node, a first output node electrically connected to a terminal end of the first primary winding and the second primary winding, a second output node electrically connected to a terminal end of the first auxiliary winding and the second auxiliary winding, a first output storage capacitor electrically connected to the terminal end of the first primary winding and the terminal end of the second primary winding and electrically connected between the first output node and the ground node, and a second output storage capacitor electrically connected to the terminal end of the first auxiliary winding and the terminal end of the second auxiliary winding and electrically connected between the second output node and the ground node. In this example and/or other examples, the buck voltage regulator device further comprises an output ripple-reducing inductor electrically connected between the terminal end of the first auxiliary winding of the first coupled inductor, the terminal end of the second auxiliary winding of the second coupled inductor, and the second output node, an input-side noise filter capacitor electrically connected between the electrical energy source and the ground node, and an output-side noise filter capacitor electrically connected between the output ripple-reducing inductor and the ground node. In this example and/or other examples, the first high-side switch, the second high-side switch, the first low-side switch, the second low-side switch, the third low-side switch, and the fourth low-side switch may comprise Gallium Nitride Field Effect Transistors (GaNFETS). In this example and/or other examples, the buck voltage regulator device may further comprise a controller configured to operate the buck voltage regulator device in four states to adjust an output voltage at the second output node relative to an input voltage at the electrical energy source based on a first turns ratio of the first coupled inductor and a second turns ratio of the second coupled inductor. In this example and/or other examples, during a first state of the four states, the controller may be configured to turn on the first high-side switch, turn on the third low-side switch, and turn on the fourth low-side switch, such that electrical energy is transferred from the electrical energy source and stored in the first primary winding of the first coupled inductor and the first output storage capacitor and electrical energy stored in the second primary winding of the second coupled inductor is transferred through the second auxiliary winding of second coupled inductor to the second output node. In this example and/or other examples, during a second state of the four states, the controller may be configured to turn on the first low-side switch, turn on the second low-side switch, turn on the third low-side switch, and turn on the fourth low-side switch, such that electrical energy is transferred from the first primary winding of the first coupled inductor through the first auxiliary winding of the first coupled inductor to the second output node and electrical energy stored in the second primary winding of the second coupled inductor is transferred through the second auxiliary winding of second coupled inductor to the second output node. In this example and/or other examples, during a third state of the four states, the controller may be configured to turn on the second high-side switch, turn on the first low-side switch, and turn on the second low-side switch, such that electrical energy stored in the first primary winding of the first coupled inductor is transferred through the first auxiliary winding of the first coupled inductor to the second output node and electrical energy is transferred from the electrical energy source and stored in the second primary winding of the second coupled inductor and the first output storage capacitor. In this example and/or other examples, during a fourth state of the four states, the controller may be configured to turn on the first low-side switch, turn on the second low-side switch, turn on the third low-side switch, and turn on the fourth low-side switch, such that electrical energy stored in the first primary winding of the first coupled inductor is transferred through the first auxiliary winding of the first coupled inductor and electrical energy stored in the second primary winding of the second coupled inductor is transferred through the second auxiliary winding of the second coupled inductor to the second output node.

In yet another example, a buck voltage regulator device, comprises a coupled inductor including a primary winding and one or more auxiliary windings including a first auxiliary winding, a high-side switch electrically connected between an electrical energy source and a starting end of the primary winding, a first low-side switch electrically connected between the starting end of the primary winding and a ground node, a second low-side switch electrically connected between a starting end of the first auxiliary winding and the ground node, a first output node electrically connected to a terminal end of the primary winding, a second output node electrically connected to a terminal end of the first auxiliary winding, a first output storage capacitor electrically connected to the terminal end of the primary winding and electrically connected between the first output node and the ground node, a second output storage capacitor electrically connected to the terminal end of the first auxiliary winding and electrically connected between the second output node and the ground node, and a controller configured to operate the high-side switch with a drive signal and further configured to operate the first low-side switch and the second low-side switch with an inverse of the drive signal to adjust an output voltage at the second output node relative to an input voltage at the electrical energy source.

The present disclosure includes all novel and non-obvious combinations and subcombinations of the various features and techniques disclosed herein. The various features and techniques disclosed herein are not necessarily required of all examples of the present disclosure. Furthermore, the various features and techniques disclosed herein may define patentable subject matter apart from the disclosed examples and may find utility in other implementations not expressly disclosed herein.

The invention claimed is:

1. A buck voltage regulator device, comprising:
   a first coupled inductor including a first primary winding and one or more auxiliary windings including a first auxiliary winding;
   a first high-side switch electrically connected between an electrical energy source and a starting end of the first primary winding;
   a first low-side switch electrically connected between the starting end of the first primary winding and a ground node;
   a second low-side switch electrically connected between a starting end of the first auxiliary winding and the ground node;
   a first output node electrically connected to a terminal end of the first primary winding;
   a second output node electrically connected to a terminal end of the first auxiliary winding;

a first output storage capacitor electrically connected to the terminal end of the first primary winding and electrically connected between the first output node and the ground node;
a second output storage capacitor electrically connected to the terminal end of the first auxiliary winding and electrically connected between the second output node and the ground node;
a second coupled inductor including a second primary winding and one or more auxiliary windings including a second auxiliary winding;
a second high-side switch electrically connected between the electrical energy source and a starting end of the second primary winding of the second coupled inductor;
a third low-side switch electrically connected between the starting end of the second primary winding of the second coupled inductor and the ground node;
a fourth low-side switch electrically connected between a starting end of the second auxiliary winding of the second coupled inductor and the ground node;
an output ripple-reducing inductor electrically connected between the terminal end of the first auxiliary winding of the first coupled inductor, the terminal end of the second auxiliary winding of the second coupled inductor, and the second output node;
an input-side noise filter capacitor electrically connected between the electrical energy source and the ground node; and
an output-side noise filter capacitor electrically connected between the output ripple-reducing inductor and the ground node.

2. The buck voltage regulator device of claim 1, further comprising:
a controller configured to operate the first high-side switch with a drive signal and operate the first low-side switch and the second low-side switch with an inverse of the drive signal to adjust an output voltage at the second output node relative to an input voltage at the electrical energy source based on a duty cycle of the drive signal and turns ratios of the first and second coupled inductors.

3. The buck voltage regulator device of claim 2, wherein the duty cycle of the drive signal is less than 50% and a number of turns of the first primary winding is greater than a number of turns of the first auxiliary winding such that the output voltage at the second output node is stepped down relative to the input voltage.

4. The buck voltage regulator device of claim 1, wherein the first high-side switch, the second high-side switch, the first low-side switch, the second low-side switch, the third low-side switch, and the fourth low-side switch comprise Gallium Nitride Field Effect Transistors (GaNFETS).

5. The buck voltage regulator device of claim 1, further comprising:
a controller configured to operate the buck voltage regulator device in four states to adjust an output voltage at the second output node relative to an input voltage at the electrical energy source based on a first turns ratio of the first coupled inductor and a second turns ratio of the second coupled inductor.

6. The buck voltage regulator device of claim 5, wherein during a first state of the four states, the controller is configured to turn on the first high-side switch, turn on the third low-side switch, and turn on the fourth low-side switch, such that electrical energy is transferred from the electrical energy source and stored in the first primary winding of the first coupled inductor and the first output storage capacitor and electrical energy stored in the second primary winding of the second coupled inductor is transferred through the second auxiliary winding of the second coupled inductor to the second output node.

7. The buck voltage regulator device of claim 6, wherein during a second state of the four states, the controller is configured to turn on the first low-side switch, turn on the second low-side switch, turn on the third low-side switch, and turn on the fourth low-side switch, such that electrical energy is transferred from the first primary winding of the first coupled inductor through the first auxiliary winding of the first coupled inductor to the second output node and electrical energy stored in the second primary winding of the second coupled inductor is transferred through the second auxiliary winding of the second coupled inductor to the second output node.

8. The buck voltage regulator device of claim 7, wherein during a third state of the four states, the controller is configured to turn on the second high-side switch, turn on the first low-side switch, and turn on the second low-side switch, such that electrical energy stored in the first primary winding of the first coupled inductor is transferred through the first auxiliary winding of the first coupled inductor to the second output node and electrical energy is transferred from the electrical energy source and stored in the second primary winding of the second coupled inductor and the first output storage capacitor.

9. The buck voltage regulator device of claim 8, wherein during a fourth state of the four states, the controller is configured to turn on the first low-side switch, turn on the second low-side switch, turn on the third low-side switch, and turn on the fourth low-side switch, such that electrical energy stored in the first primary winding of the first coupled inductor is transferred through the first auxiliary winding of the first coupled inductor to the second output node and electrical energy stored in the second primary winding of the second coupled inductor is transferred through the second auxiliary winding of the second coupled inductor to the second output node.

10. A buck voltage regulator device, comprising:
a first coupled inductor including a first primary winding and one or more auxiliary windings including a first auxiliary winding;
a first high-side switch electrically connected between an electrical energy source and a starting end of the first primary winding of the first coupled inductor;
a first low-side switch electrically connected between the starting end of the first primary winding of the first coupled inductor and a ground node;
a second low-side switch electrically connected between the electrical energy source and a starting end of the first auxiliary winding of the first coupled inductor, wherein the second low-side switch includes a drain, a gate, and a source, wherein the drain is coupled directly to the starting end of the first auxiliary winding of the first coupled inductor, and wherein the source is coupled directly to the ground node;
a second coupled inductor including a second primary winding and one or more auxiliary windings including a second auxiliary winding;
a second high-side switch electrically connected between the electrical energy source and a starting end of the second primary winding of the second coupled inductor;

a third low-side switch electrically connected between the starting end of the second primary winding of the second coupled inductor and the ground node;
a fourth low-side switch electrically connected between the electrical energy source and a starting end of the second auxiliary winding of the second coupled inductor, wherein the fourth low-side switch includes a drain, a gate, and a source, wherein the drain is coupled directly to the starting end of the second auxiliary winding of the second coupled inductor, and wherein the source is coupled directly to the ground node;
a first output node electrically connected to a terminal end of the first primary winding and the second primary winding;
a second output node electrically connected to a terminal end of the first auxiliary winding and the second auxiliary winding;
a first output storage capacitor electrically connected to the terminal end of the first primary winding and the terminal end of the second primary winding and electrically connected between the first output node and the ground node; and
a second output storage capacitor electrically connected to the terminal end of the first auxiliary winding and the terminal end of the second auxiliary winding and electrically connected between the second output node and the ground node.

11. The buck voltage regulator device of claim 10, further comprising:
an output ripple-reducing inductor electrically connected between the terminal end of the first auxiliary winding of the first coupled inductor, the terminal end of the second auxiliary winding of the second coupled inductor, and the second output node;
an input-side noise filter capacitor electrically connected between the electrical energy source and the ground node; and
an output-side noise filter capacitor electrically connected between the output ripple-reducing inductor and the ground node.

12. The buck voltage regulator device of claim 10, wherein the first high-side switch, the second high-side switch, the first low-side switch, the second low-side switch, the third low-side switch, and the fourth low-side switch comprise Gallium Nitride Field Effect Transistors (GaN-FETS).

13. The buck voltage regulator device of claim 10, further comprising:
a controller configured to operate the buck voltage regulator device in four states to adjust an output voltage at the second output node relative to an input voltage at the electrical energy source based on a first turns ratio of the first coupled inductor and a second turns ratio of the second coupled inductor.

14. The buck voltage regulator device of claim 13, wherein during a first state of the four states, the controller is configured to turn on the first high-side switch, turn on the third low-side switch, and turn on the fourth low-side switch, such that electrical energy is transferred from the electrical energy source and stored in the first primary winding of the first coupled inductor and the first output storage capacitor and electrical energy stored in the second primary winding of the second coupled inductor is transferred through the second auxiliary winding of the second coupled inductor to the second output node.

15. The buck voltage regulator device of claim 14, wherein during a second state of the four states, the controller is configured to turn on the first low-side switch, turn on the second low-side switch, turn on the third low-side switch, and turn on the fourth low-side switch, such that electrical energy is transferred from the first primary winding of the first coupled inductor through the first auxiliary winding of the first coupled inductor to the second output node and electrical energy stored in the second primary winding of the second coupled inductor is transferred through the second auxiliary winding of the second coupled inductor to the second output node.

16. The buck voltage regulator device of claim 15, wherein during a third state of the four states, the controller is configured to turn on the second high-side switch, turn on the first low-side switch, and turn on the second low-side switch, such that electrical energy stored in the first primary winding of the first coupled inductor is transferred through the first auxiliary winding of the first coupled inductor to the second output node and electrical energy is transferred from the electrical energy source and stored in the second primary winding of the second coupled inductor and the first output storage capacitor.

17. The buck voltage regulator device of claim 15, wherein during a fourth state of the four states, the controller is configured to turn on the first low-side switch, turn on the second low-side switch, turn on the third low-side switch, and turn on the fourth low-side switch, such that electrical energy stored in the first primary winding of the first coupled inductor is transferred through the first auxiliary winding of the first coupled inductor and electrical energy stored in the second primary winding of the second coupled inductor is transferred through the second auxiliary winding of the second coupled inductor to the second output node.

18. A buck voltage regulator device, comprising:
a first coupled inductor including a first primary winding and one or more auxiliary windings including a first auxiliary winding;
a first high-side switch electrically connected between an electrical energy source and a starting end of the first primary winding;
a first low-side switch electrically connected between the starting end of the first primary winding and a ground node;
a second low-side switch electrically connected between a starting end of the first auxiliary winding and the ground node;
a first output node electrically connected to a terminal end of the first primary winding;
a second output node electrically connected to a terminal end of the first auxiliary winding;
a first output storage capacitor electrically connected to the terminal end of the first primary winding and electrically connected between the first output node and the ground node;
a second output storage capacitor electrically connected to the terminal end of the first auxiliary winding and electrically connected between the second output node and the ground node;
a second coupled inductor including a second primary winding and one or more auxiliary windings including a second auxiliary winding;
a second high-side switch electrically connected between the electrical energy source and a starting end of the second primary winding of the second coupled inductor;
a third low-side switch electrically connected between the starting end of the second primary winding of the second coupled inductor and the ground node;

a fourth low-side switch electrically connected between a starting end of the second auxiliary winding of the second coupled inductor and the ground node;

an output ripple-reducing inductor electrically connected between the terminal end of the first auxiliary winding of the first coupled inductor and the second output node;

an input-side noise filter capacitor electrically connected between the electrical energy source and the ground node; and an output-side noise filter capacitor electrically connected between the output ripple-reducing inductor and the ground node; and a controller configured to operate the first high-side switch with a drive signal and further configured to operate the first low-side switch and the second low-side switch with an inverse of the drive signal to adjust an output voltage at the second output node relative to an input voltage at the electrical energy source.

19. The buck voltage regulator device of claim 18, wherein the controller is configured to operate the buck voltage regulator device in four states to adjust an output voltage at the second output node relative to an input voltage at the electrical energy source based on a first turns ratio of the first coupled inductor and a second turns ratio of the second coupled inductor.

20. The buck voltage regulator device of claim 19, wherein a duty cycle of the drive signal is less than 50% and a number of turns of the first primary winding is greater than a number of turns of the first auxiliary winding such that the output voltage at the second output node is stepped down relative to the input voltage.

* * * * *